United States Patent Office 3,423,939
Patented Jan. 28, 1969

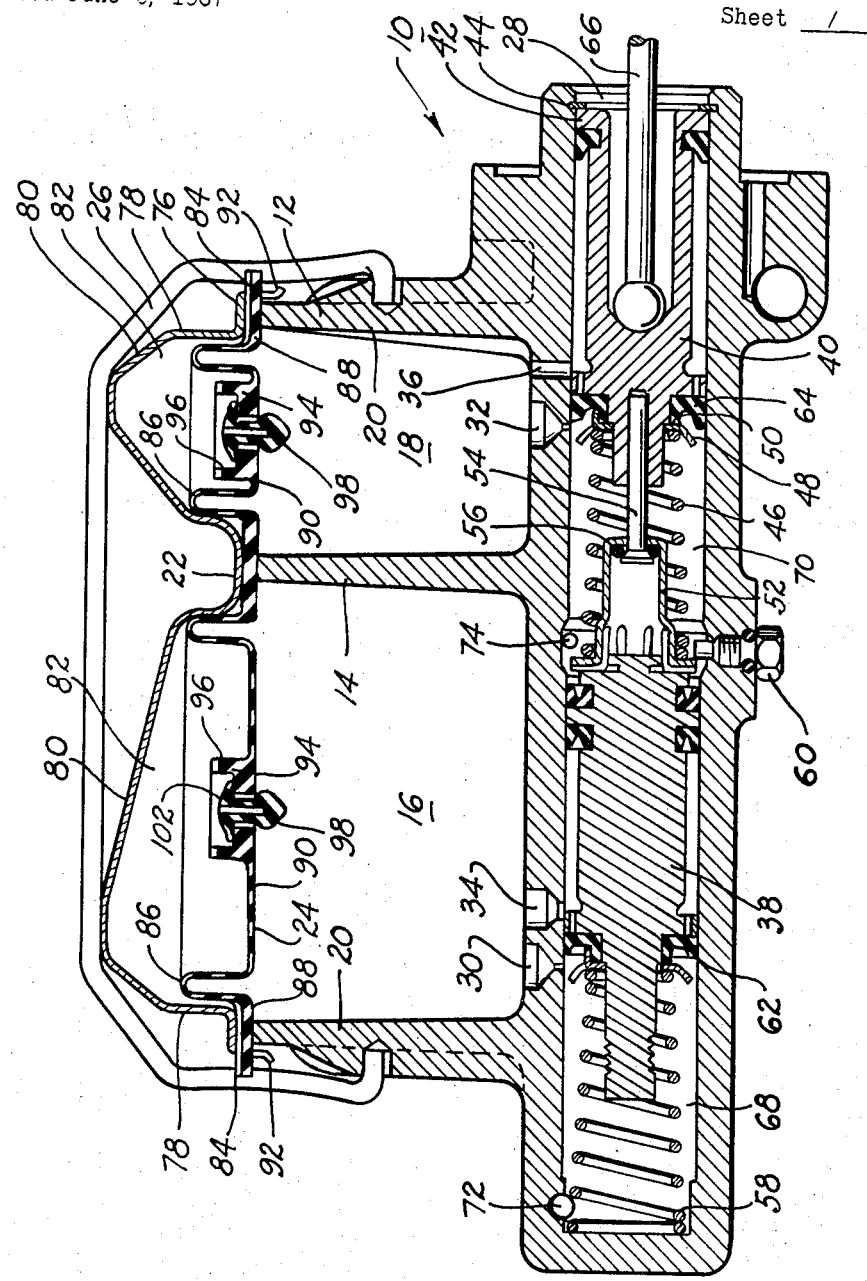

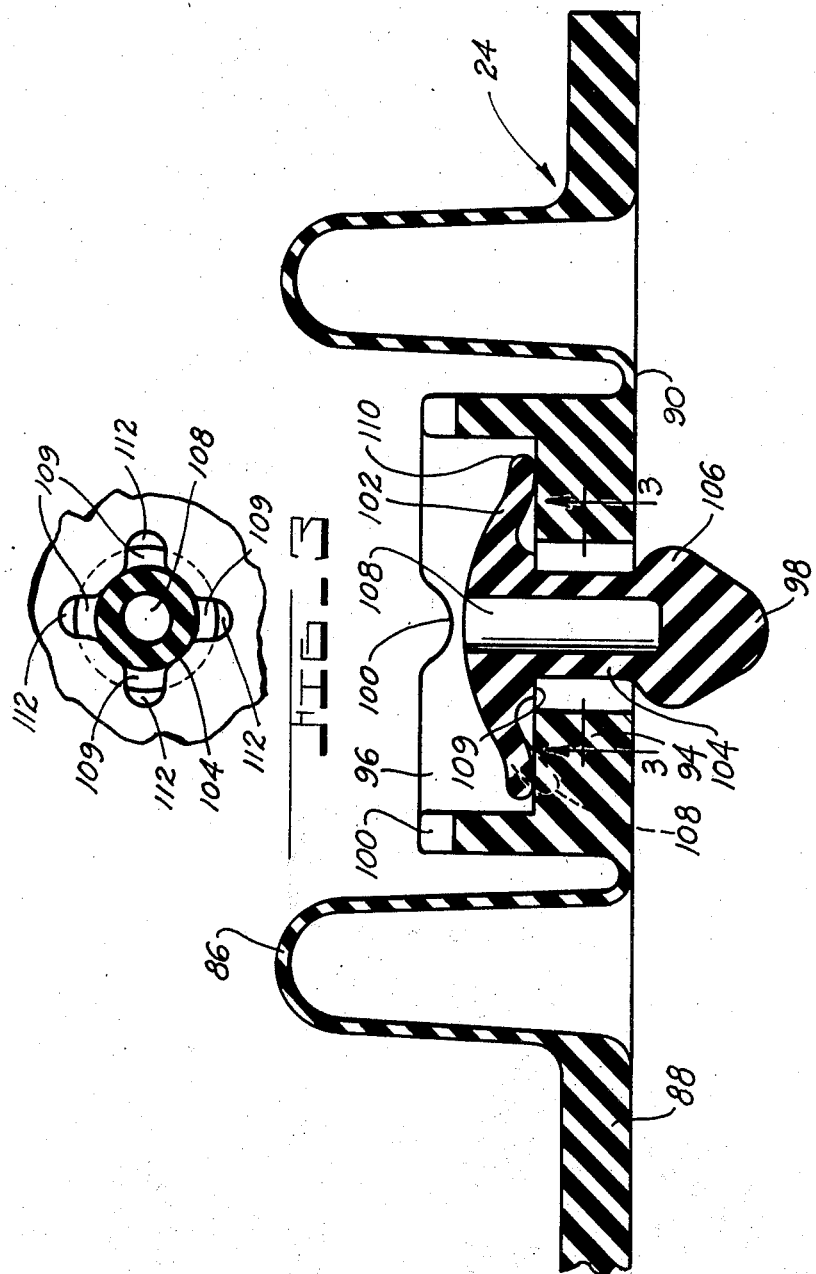
RICHARD L. LEWIS.
WILLIAM E. FERRELL.
PAUL B. SHUTT.
INVENTORS
BY [signature]
ATTORNEY.

3,423,939
MASTER CYLINDER VENT VALVE
Richard L. Lewis, William E. Ferrell, and Paul B. Shutt, St. Joseph, Mich., assignors to The Bendix Corporation, a corporation of Delaware
Filed June 6, 1967, Ser. No. 643,921
U.S. Cl. 60—54.6                    15 Claims
Int. Cl. F15b *17/06;* F01b *19/02;* B65d *55/16*

ABSTRACT OF THE DISCLOSURE

A master cylinder diaphragm pressure relief valve for venting the master cylinder reservoir for the purpose of relieving any pressure in excess of approximately 1 p.s.i. in the reservoir, which vent valve prevents entrance of air, water, or dirt into the brake system from the outside atmospheric environment.

SUMMARY

With the advent of the newer disc brake equipped cars, it has been experienced that any maintenance of pressure within the braking system will create undue wear of the brake pads, and, in some cases, heat up the brake fluid in the brake system to such an extent that through percolation one may need to replace the brake fluid sooner than is necessary.

It is, therefore, a principlal object of this invention to provide a vent valve which will prevent communication of the surrounding atmospheric environment with the fluid within the brake system and allow the fluid in a normally atmospheric pressure environment with the reservoir to be vented whenever the pressure rises above a predetermined level that is considered safe for the non-actuated condition of the master cylinder.

It is a further object of this invention to provide a vent valve operable by a pressure above a predetermined value with a controlling means that is subjected to pressure within the master cylinder reservoir to raise and vent gaseous and/or fluid pressure within the master cylinder reservoir.

DRAWING DESCRIPTION

FIGURE 1 is a cross sectional view of a split master cylinder incorporating vent valve means in accordance with the principles of this invention;

FIGURE 2 is an enlarged partially cross sectioned view of the sealing diaphragm of the master cylinder of FIGURE 1 showing the vent valve in accordance with the principles of this invention; and FIGURE 3 is a partial view of the diaphragm and vent valve installation taken along the line 3—3 of FIGURE 2.

DETAILED DESCRIPTION

Referring now to the embodiment shown in FIGURE 1, the master cylinder indicated generally by reference numeral 10 includes a reservoir 12 being divided by a partition 14 which separates the hydraulic fluid within the reservoir into two distinct compartments or chambers 16 and 18. The chambers 16 and 18 are segregated one from the other so that each can contain a full charge of hydraulic fluid although the other has been emptied by a hydraulic failure. The reservoir is defined by a surrounding wall 20 and a cover plate 22 having a sealing means 24 suitably secured to the top of the walls 20, as by the spring clip 26, to confine the fluid within the reservoir 12 against loss.

Between the reservoir 12 and master cylinder bore 28 are two compensating ports 30 and 32 which are spaced to provide fluid access from the compartments 16 and 18 respectively to the master cylinder bore 28. Each compartment 16 and 18 is also provided with a breather opening, opening 34 for compartment 16, an opening 36 for compartment 18, so that fluid can pass freely between cylinder bore 28 and compartment 16, 18 to prevent vacuum formation rearwardly of the pressure-creating faces of plungers 38 and 40. The plunger 40 includes a flange 42 mounting a secondary seal and normally in abutment with a snap ring 44 in the retracted position of the plunger 40 in the bore 28. The snap ring 44, as seen, fits within a groove of the housing of the master cylinder. A helical spring 46 is compressed between a spring bearing plate 48 fitted onto a shoulder 50 of the plunger 40 and a caged spring retainer 52 positioned by a bolt 54. As seen, between the head of the bolt 54 and the retainer 52, a rubber ring 56 is provided to eliminate noise of metal-to-metal contact therebetween. As is realized by those skilled in the art to which this invention relates the loading of the spring 46 by the bolt 54 is chosen so as to get the desired cooperation in movement of the plungers or pistons 38 and 40 within the bore 28. As will also be appreciated by those skilled in the art, prior to the assembly of the plunger 40 into the bore and the fitting of the snap ring 44 into its receptacle groove of the housing of the master cylinder 10, the piston or the plunger 38 is inserted into a bore with a return spring 58 compressed between the end of the bore and the plunger 38. Thereafter, the piston or plunger 40 with its cage spring assembly is inserted into the bore and compressed downwardly therein until a return stop bolt 60 is sealingly assembled to the housing of the master cylinder 10. The plungers 38 and 40 each are provided with lip seals 62 and 64 which in the retracted position lie immediately behind the compensating ports 30 and 32. Upon the actuation of the plunger 40 by the pedal operated push rod 66 the lip seals 62 and 64 pass by the compensating ports 30 and 32 to close off the communication of the reservoir cavities 16 and 18 with the pressure developing chambers 68 and 70 whereby fluid pressure may be delivered to the outlet ports 72 and 74, respectively.

As seen, the cover member 22 is provided with a flat base portion 76 which has a pair of spaced annular walls 78 extending upwardly thereof and a pair of top plates 80 integral with the respective annular walls 78. Each annular wall and top plate provides a cup-shaped cavity 82. This cavity is vented via serrations 84 in the base portion 76 on either side of the sealing member 24 between it and the flat base portions 76.

The sealing member 24 has a pair of flexible elements each of which comprise an annular U-shaped portion 86 which extends into the cavity 82 and is integral with a main base portion 88 of the sealing member and integral with a disc-shaped portion 90 which is spaced from the main base portion by an annular recess defined by the U-shaped portion 86. Preferably, the flexible elements are of thinner rubber material than the main base portion 88. If desired, a pair of detents 92 extend from the cover member 22 and pass through a respective slot (not shown) of the sealing member to retain the sealing member with the cover member.

Overlying the partition 14 the cover member 22 is depressed so as to exert a squeezing action on the sealing member 24 on top of the partition member 14 to maintain the segregation of the chambers 16 and 18 of the reservoir 12, when the spring clip 26 is holding the cover member 22 on the walls 20 of the reservoir.

The disc-shaped portions 90 are provided with cup-shaped portions 94 having an annular wall 96 extending upwardly into the cavities 82 within which a vent valve 98 is assembled for relieving pressures above a predetermined value in the chambers 16 and 18.

This structure is more particularly illustrated with reference to FIGURE 2 showing the sealing member 24 with the sizing of the base portion 88, the U-shaped portion 86 and the disc-shaped portion 90 enlarged. Upon observing FIGURE 2, it is clearly shown that the annular wall 96 is scalloped as at 100 so that when the disc portion 90 is caused to rise by pressure in either the chambers 16 or 18 fluid passage about the unmbrella portion 102 of the valve 98 will not be precluded. The valve 98 is shown to have a body portion 104 integral with the annular umbrella portion 102, which body portion is formed with bulbous end 106 opposite the umbrella portion 102 for gripping the underneath side of the disc-shaped portion 90 of the sealing member 24. In the free state the umbrella portion 102 will generally have a circular profile as shown by the dotted lines 108 in this figure. The body portion 104 is axially drilled as at 108 to provide ease of assembly and the desired resiliency for material tolerances to maintain contact of poppet shoulder 109 with the upper surface of cup 94 so that material tolerances do not interfere with valve operation.

With reference now to FIGURE 3, the hole through the disc-shaped portion 90 is fluted as at 112 so as to provide communication from the master cylinder reservoir chamber 16 or 18 to the other side of the diaphragm portion which is directly underneath the umbrella portion 102 of the poppet 98. Also, the cup-shaped portion 94 is of substantially greater thickness about the fluted openings 112 so as to provide the desired rigidity to the resilient structure of the sealing member 24 around the poppet 102 and thereby prevent deformation of the sealing member along with the deformation of the umbrella portion which would preclude the venting of the chambers 16 or 18 whenever the pressure therein reaches an excess value. As seen, upon assembly of the poppet 98 to the cup-shaped portion 94 the umbrella portion 102 is deformed so that the rim 110 is biased against the upper surface of cup-shaped portion 94 thereby requiring a certain pressure differential across the umbrella portion before the venting of the chambers 16 or 18 can be caused by the pressures therein.

OPERATION

In operation, the operator of the vehicle will actuate a brake pedal (not shown) to translate the push rod 66 internally of the bore 28 whereby the pistons 38 and 40 will close off the compensating ports 30 and 32 to deliver pressurized fluid at the discharge outlets 72 and 74 of the master cylinder.

Upon release of the brake pedal, the pistons 38 and 40 will be returned by the spring 58 and the caged spring 46 to the released attitudes shown in FIGURE 1. If any residual pressure remains in the braking system, so as to pressurize the chambers 68 and 70 in the released attitude, which will in turn then pressurize the chambers 16 and 18 of the reservoir 12, this pressure will be directed to the underside of the valves 98 to raise the rims 110 of the umbrella portion 102 thereof to port a gaseous or hydraulic pressure to the vents 84 between the base portion 76 and the main base portion 88 of the sealing member 24.

Having described an operative construction, it is now desired to set forth the intended protection sought for this invention by the appended claims.

We claim:
1. In a sealed reservoir for a hydraulic means a valve means for a sealing means between the reservoir chamber and the cover over same, said valve means comprising:
    a tubular body portion snap fitted to said sealing means inside of a vent passage therethrough; and
    an umbrella portion attached to said tubular body portion, said umbrella portion leaving a resilient rim deformed against said sealing means over said vent passage by attachment of said tubular portion to said sealing means.
2. The structure of claim 1 wherein said sealing means has an annular wall about said umbrella portion to prevent interference of said cap therewith.
3. The structure of claim 2 wherein said tubular portion has a bulbous end opposite the umbrella portion for gripping the underside of said sealing means to maintain pressure contact of said rim with the upper side of said sealing means.
4. A master cylinder comprising:
    piston means operably arranged in a bore;
    reservoir means in fluid communication with said bore;
    cap means for said reservoir, said cap means including a cover member and a sealing member bridging said reservoir under said cover member to define a chamber above and below said sealing member, said sealing member having an annular wall projecting towards said cover member surrounding a series of openings through said sealing member; and,
    valve means operatively connected to said sealing member internally of said annular wall to be pressure responsive for venting said reservoir via said openings when pressure therein exceeds a predetermined value.
5. A master cylinder according to claim 4 wherein said sealing member comprises:
    an annular outer portion squeezed between said cover member and a peripheral wall of said reservoir;
    an inner disc shaped portion carrying said annular wall; and
    an annular U-shaped portion connecting said outer portion and said inner portion.
6. A master cylinder according to claim 4 wherein said valve means includes:
    a body portion snap fitted to said sealing member; and
    a resilient umbrella portion extending annularly from said tubular body portion within said annular wall and converging by its resiliency onto said sealing member covering said series of openings.
7. A master cylinder according to claim 5 wherein said valve means includes:
    a body portion snap fitted to said sealing member; and
    a resilient umbrella portion extending annularly from said tubular body portion within said annular wall and converging by its resiliency onto said sealing member covering said series of openings.
8. A master cylinder according to claim 6 wherein said annular wall is scalloped to prevent fluid blockage when said valve is relieving pressure in said reservoir.
9. A split master cylinder comprising:
    a housing having a bore and a reservoir cavity with separate chambers communicated to said bore;
    cap means over said reservoir cavity including a cover member and a flexible sealing member assembled to segregate said chambers, said sealing member having cup-shaped portions over each chamber with wall means preventing fluid engagement of said sealing member with said cap, said sealing member having openings therethrough within said cup-shaped portions; and
    valve means in each of said cup shaped portions and operatively connected to said sealing member to permit flow under pressure from said chambers through said sealing member to atmosphere via vent openings registering with the space between said cover member and said sealing member.
10. A master cylinder according to claim 9 wherein said valve means includes:
    a body portion snap fitted to said sealing member; and
    a resilient umbrella portion extending annularly from said tubular body portion within said annular wall and converging by its resiliency onto said sealing member covering said series of openings.
11. A master cylinder according to claim 9 wherein said annular wall is scalloped to prevent fluid backage when said valve is relieving pressure in said reservoir.
12. A master cylinder according to claim 11 wherein said valve means includes:
    a body portion snap fitted to said sealing member; and
    a resilient umbrella portion extending annularly from said tubular body portion within said annular wall and converging by its resiliency onto said sealing member covering said series of openings.

13. A master cylinder according to claim 10 wherein said resilient umbrella is an annular flange with said body portion being annular at the upper portion thereof.

14. In a fluid container having a cap with a sealing diaphragm between a housing and the cap upon assembly of the cap to the housing to seal the container, a vent valve to prevent pressure build-up in the container, said vent valve comprising:
a body portion snap fitted to the diaphragm adjacent a passage through said diaphragm; and
a resilient umbrella portion extending annularly from said body portion, which umbrella portion has a convergent periphery over said passage to engage said diaphragm such that said passage is between the body and the extreme peripheral portion contacting the diaphragm.

15. The structure of claim 14 wherein said diaphragm is provided with an annular wall which projects upwardly towards said cap and within which said vent valve is located such that flexure of said diaphragm toward said cap cannot affect the operation of said vent valve.

References Cited

UNITED STATES PATENTS

| | | | |
|---|---|---|---|
| 2,177,224 | 10/1939 | Ohlrogge | 220—44 XR |
| 2,933,102 | 4/1960 | Hillman et al. | 220—44 XR |
| 2,952,128 | 9/1960 | Highland | 60—54.6 |
| 3,059,671 | 10/1962 | Kings | 60—54.6 XR |
| 3,206,932 | 9/1965 | Bixby | 60—54.6 |
| 3,206,933 | 9/1965 | Dega | 60—54.6 |
| 3,233,411 | 2/1966 | Schubert | 60—54.6 |
| 2,571,893 | 10/1951 | Kendall | 137—525 XR |

MARTIN P. SCHWADRON, *Primary Examiner.*

R. R. BUNEVICH, *Assistant Examiner.*

U.S. Cl. X.R.

220—44; 92—98; 137—525